United States Patent
Durand et al.

(10) Patent No.: US 12,449,162 B2
(45) Date of Patent: Oct. 21, 2025

(54) SYSTEM FOR HEAT EXCHANGE BETWEEN A BUILDING AND THE EARTH'S SUB-SOIL COMPRISING THE CIRCULATION OF PHASE CHANGE MATERIALS IN A CLOSED CIRCUIT

(71) Applicant: IFP Energies nouvelles, Rueil-Malmaison (FR)

(72) Inventors: Isabelle Durand, Rueil-Malmaison (FR); Habiba Boulharts, Rueil-Malmaison (FR); Bernard Bourbiaux, Rueil-Malmaison (FR); Vivien Esnault, Rueil-Malmaison (FR); Jean-Francois Lecomte, Rueil-Malmaison (FR); Vlasios Leontidis, Rueil-Malmaison (FR); Marie Marsiglia, Rueil-Malmaison (FR); Elena Sanz, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 270 days.

(21) Appl. No.: 18/256,003

(22) PCT Filed: Nov. 24, 2021

(86) PCT No.: PCT/EP2021/082787
§ 371 (c)(1),
(2) Date: Jun. 5, 2023

(87) PCT Pub. No.: WO2022/122384
PCT Pub. Date: Jun. 16, 2022

(65) Prior Publication Data
US 2024/0053063 A1 Feb. 15, 2024

(30) Foreign Application Priority Data
Dec. 8, 2020 (FR) .................................... 2012847

(51) Int. Cl.
*F24T 10/10* (2018.01)

(52) U.S. Cl.
CPC .................................... *F24T 10/10* (2018.05)

(58) Field of Classification Search
CPC ......... F28D 20/023; F24T 10/10; F24T 10/15; F25B 2313/002; F24F 5/0046; F24F 2005/0057
See application file for complete search history.

(56) References Cited

U.S. PATENT DOCUMENTS 3,596,713 A * 8/1971 Katz .......................... F01P 9/00
165/104.31
3,780,262 A * 12/1973 Rudd .................... F24F 5/0046
165/104.31

(Continued)

FOREIGN PATENT DOCUMENTS

| CA | 2638235 A1 | 2/2010 |
| FR | 2874933 A1 | 3/2006 |

(Continued)

*Primary Examiner* — Travis Ruby
(74) *Attorney, Agent, or Firm* — FITCH, EVEN, TABIN & FLANNERY, LLP (57) ABSTRACT

The present invention relates to a system of heat exchange between a building (1) and the Earth's subsurface (5), comprising a closed loop with at least one pipe (9) installed in said subsurface (5) for heat exchange with subsurface (5), and connected by connecting pipes (4, 7) to at least one pipe (6) installed in said building (1) for heat exchange with building (1), the closed loop comprising a circulation pump (P) for circulating a fluid through said closed loop, and the fluid comprising capsules containing phase change materials.
The invention also relates to a method for cooling or heating a building (1) from the heat exchange system between a building (1) and the Earth's subsurface (5).

20 Claims, 7 Drawing Sheets

(56) References Cited

U.S. PATENT DOCUMENTS

| | | | | | |
|---|---|---|---|---|---|
| 4,104,883 | A | * | 8/1978 | Naef | F01K 25/106 60/692 |
| 4,158,291 | A | * | 6/1979 | Jones | F25B 29/00 60/671 |
| 4,162,394 | A | * | 7/1979 | Faccini | F24S 10/95 392/386 |
| 4,240,268 | A | * | 12/1980 | Yuan | F24F 5/0046 165/104.11 |
| 4,538,673 | A | * | 9/1985 | Partin | F24T 10/15 165/45 |
| 4,660,625 | A | * | 4/1987 | Musinski | F28D 15/0233 165/47 |
| 4,911,232 | A | * | 3/1990 | Colvin | F28D 20/023 165/10 |
| 4,993,483 | A | * | 2/1991 | Harris | F24T 10/15 165/104.31 |
| 5,261,251 | A | * | 11/1993 | Galiyano | G05D 23/19 62/238.7 |
| 5,372,016 | A | * | 12/1994 | Rawlings | F24T 10/30 62/238.7 |
| 5,456,852 | A | * | 10/1995 | Isiguro | C09K 5/063 165/10 |
| 5,634,515 | A | * | 6/1997 | Lambert | E21B 10/58 165/45 |
| 5,671,608 | A | * | 9/1997 | Wiggs | F25B 30/06 165/45 |
| 5,916,478 | A | * | 6/1999 | Nakahira | F28D 20/023 252/76 |
| 6,447,692 | B1 | * | 9/2002 | Momoda | C09K 5/10 252/75 |
| 6,619,841 | B2 | * | 9/2003 | Lenz | H05G 1/02 378/130 |
| 6,789,608 | B1 | * | 9/2004 | Wiggs | F24T 10/15 165/45 |
| 7,037,582 | B2 | * | 5/2006 | Xing | B01J 13/16 264/4.4 |
| 7,234,314 | B1 | * | 6/2007 | Wiggs | F24T 10/15 62/235.1 |
| 7,942,018 | B2 | * | 5/2011 | Niu | F28D 20/021 62/434 |
| 8,382,369 | B2 | * | 2/2013 | Piscsalko | G01K 1/026 73/803 |
| 8,679,629 | B2 | * | 3/2014 | Zhao | B01J 13/14 428/321.5 |
| 9,016,374 | B2 | * | 4/2015 | Quintero | E21B 36/001 166/302 |
| 10,345,051 | B1 | * | 7/2019 | Halloran | F28D 1/0477 |
| 2004/0031585 | A1 | * | 2/2004 | Johnson, Jr. | F25B 30/06 165/45 |
| 2004/0159110 | A1 | * | 8/2004 | Janssen | F28D 7/0008 62/298 |
| 2006/0231233 | A1 | * | 10/2006 | Farid | H01L 23/427 257/E23.098 |
| 2007/0151704 | A1 | * | 7/2007 | Elmore | F28D 20/0052 165/45 |
| 2009/0159718 | A1 | * | 6/2009 | Andrews | E04F 17/08 52/220.1 |
| 2010/0200192 | A1 | | 8/2010 | Consigny | |
| 2010/0230072 | A1 | * | 9/2010 | Carlin | F24D 3/18 165/45 |
| 2011/0308268 | A1 | * | 12/2011 | Krimsky | F25B 30/06 62/260 |
| 2012/0003913 | A1 | * | 1/2012 | Shaffer | F24F 5/0075 454/200 |
| 2012/0018116 | A1 | * | 1/2012 | Mathur | B65B 5/06 165/10 |
| 2012/0144829 | A1 | * | 6/2012 | Wiggs | F24T 10/30 60/641.2 |
| 2014/0096860 | A1 | * | 4/2014 | Yang | F28F 13/00 138/149 |
| 2014/0166232 | A1 | | 6/2014 | Al-Hallaj et al. | |
| 2014/0178485 | A1 | * | 6/2014 | Champagne | C11D 3/384 424/497 |
| 2015/0135744 | A1 | * | 5/2015 | Gault | F24D 5/12 62/238.7 |
| 2015/0377522 | A1 | * | 12/2015 | Ziegenfuss | F24T 10/15 264/261 |
| 2015/0377523 | A1 | * | 12/2015 | Ziegenfuss | E02D 27/32 52/741.15 |
| 2016/0123009 | A1 | * | 5/2016 | Ayambem | C09K 5/063 252/73 |
| 2016/0245550 | A1 | * | 8/2016 | Sønju | F24T 10/10 |
| 2017/0127563 | A1 | * | 5/2017 | Chainer | H05K 7/20818 |
| 2017/0254601 | A1 | * | 9/2017 | Sutterlin | F24D 19/1042 |
| 2018/0010013 | A1 | * | 1/2018 | Lentz | B01J 13/08 |
| 2018/0242665 | A1 | * | 8/2018 | Ryan | B01J 20/265 |
| 2020/0033014 | A1 | * | 1/2020 | Ballegeer | F25B 30/06 |
| 2020/0378633 | A1 | * | 12/2020 | Hall | F24F 5/0089 |
| 2021/0057793 | A1 | * | 2/2021 | Hendriksen | H01M 10/659 |
| 2021/0274681 | A1 | * | 9/2021 | Holland | F28F 27/02 |
| 2021/0325089 | A1 | * | 10/2021 | Toews | E21B 47/07 |
| 2022/0400625 | A1 | * | 12/2022 | Gordon | A01G 9/245 |

FOREIGN PATENT DOCUMENTS

| | | |
|---|---|---|
| GB | 2470400 A | 11/2010 |
| WO | 2020/077967 A1 | 4/2020 |

* cited by examiner

SYSTEM FOR HEAT EXCHANGE BETWEEN A BUILDING AND THE EARTH'S SUB-SOIL COMPRISING THE CIRCULATION OF PHASE CHANGE MATERIALS IN A CLOSED CIRCUIT

CROSS-REFERENCE TO RELATED APPLICATIONS

This application is a U.S. national phase application filed under 35 U.S.C. § 371 of International Application No. PCT/EP2021/082787, filed Nov. 24, 2021, designating the United States, which claims priority from French Application No. 2012847, filed Dec. 8, 2020, which are incorporated herein by reference in their entireties.

FIELD OF THE INVENTION

The invention relates to the field of cooling (and/or heating) a building by heat exchange with the Earth's subsurface, known as geothermal energy.

BACKGROUND OF THE INVENTION

To cool a building, it is well known to store the heat recovered from the building below the Earth's surface. Similarly, it is also known to recover heat from the Earth's surface for heating a building. This is usually achieved by means of a heat transfer fluid (glycol water for example) circulating between the building and the Earth's surface in a closed-loop piping system using a pump.

In order to improve energy storage and recovery performances, phase change materials (PCMs) have been used to improve exchanges with the Earth's surface and/or the building.

Patent application GB-2,470,400 relates to a geothermal system with two phase change material tanks stored in the ground. A circulating fluid allows the heat from the PCMs to be recovered and transferred to a heat pump. However, this system requires heat exchangers between the PCMs and the fluid so that only the fluid circulates, the PCMs remaining in the dedicated tanks. Heat recovery is therefore not optimal. Additionally, the system requires tanks for storing PCMs and heat exchangers. This increases the system floor space and causes significant energy consumption for continuous circulation of the fluid.

Prior art also knows patent application US-2014/0,166,232, which uses two closed-loop circuits with a heat exchanger between these two circuits. Furthermore, this system uses a non-circulating PCM tank and a circulating fluid for heat exchange with the PCMs.

Again, heat recovery is not optimal since the heat exchanger between the two circuits involves an additional thermal resistance, thus limiting the overall heat transfer coefficient. Furthermore, the system requires a heat exchanger between the PCMs and the circulating fluid, as well as a PCM tank.

Additionally, the fluid flows continuously, which involves significant energy consumption.

The aim of the invention is to provide a system for cooling and/or heating a building by means of the Earth's subsurface, making it possible to improve heat recovery or release, to reduce floor space in relation to previous systems, to reduce energy consumption through a fluid flow that may be discontinuous depending on conditions, and to reduce the efficiency loss through limitation of thermal resistances in series (limitation of the number of heat exchangers).

This aim is achieved by a heat exchange system between a building and the subsurface, comprising a closed loop (also referred to as closed-loop circuit) with at least one device installed in the subsurface for heat exchange with the subsurface, and connected by connecting pipes to at least one device installed in the building for heat exchange with the building. The closed loop comprises a circulation pump for circulating a fluid comprising capsules containing phase change materials. Indeed, circulation of the encapsulated PCMs allows to significantly improve heat exchanges by means of the latent heat of melting, combined with the heat capacity of the PCMs. In addition, circulation of the encapsulated PCMs makes it possible to do without tanks for keeping the PCMs in an enclosed space and for preventing PCM circulation in the closed loop. Thus, a heat exchanger such as a tube exchanger between the PCMs and the fluid for energy recovery (in heating or cooling mode) is not necessary. The mechanical design is therefore simplified and the size of the facility can be reduced. The installation and operating costs are therefore also reduced.

The latent heat of melting of the PCMs increases the building cooling or heating capacity, notably the cooling or heating rates, which allows the fluid circulation and therefore the energy consumption related thereto to be greatly limited.

SUMMARY OF THE INVENTION

The invention relates to a heat exchange system between a building and the Earth's subsurface, comprising a closed loop comprising at least one device installed in said subsurface for heat exchange with the subsurface, connecting pipes, and at least one device installed in said building for heat exchange with the building, the device installed in the subsurface being connected by said connecting pipes to the device installed in the building, the closed loop comprising at least one circulation pump for circulating a fluid through said closed loop. Furthermore, the system comprises the fluid comprising capsules containing phase change materials.

According to a configuration, the system comprises a heat exchange means for heating a second fluid flowing into said building, the second fluid preferably being water from the distribution network.

According to an implementation of the invention, the circulation pump is a progressing cavity pump or an unbalanced vane pump.

Preferably, the pump is positioned on the part of connecting pipes configured for circulating the phase change material capsules from a heat source to a cold source, the cold and heat sources being the building and the subsurface respectively, or vice versa.

Advantageously, the material of the capsules comprises organic, inorganic and/or metallic materials, preferably the material of the capsules comprises silica, molten silica, graphene, biological porous carbon, polymers, polyamides, nylon, lignins, fatty acids, esters, crown ethers, and/or the capsule is a molecular cage.

Preferably, the capsules are functionalized with ionic molecules or hydrophobic long chains.

Advantageously, the fluid comprises water, and preferably at least one additive selected from among a biocide, an antifreeze, a surfactant, a capsule dispersing agent and/or an anticorrosion additive.

According to an embodiment of the invention, the phase change materials comprise metals, metal alloys, inorganic materials, organic materials or hydrates, preferably, the phase change materials comprise gallium, calcium salts, fatty acids, esters, carboxylic acid, or they consist of a eutectic mixture of these materials and, more preferably, the phase change materials comprise paraffins.

Preferably, the size of the capsules ranges between 5 nm and 2 mm, and the thickness of the capsule material ranges between 0.5 nm and 500 µm.

Advantageously, at least part of the connecting pipes comprises a thermal insulation layer.

According to a configuration of the invention, at least one device installed in the building is located in at least one floor, in at least one ceiling and/or in at least one wall.

According to a variant of the invention, at least one device installed in the building and/or at least one device installed in the subsurface comprises several parallel branches and/or circulation loops.

Advantageously, the system comprises temperature measurement means for measuring the temperature of the building and/or of the pipes and/or of the devices and/or of the subsurface, and the system comprises an automatic control system for starting and stopping the circulation pump depending on the temperatures recorded by the temperature measurement means.

Preferably, at least one device installed in the subsurface is positioned at a depth of between 4 m and 100 m below the ground surface.

According to an implementation of the invention, the connecting pipes are installed at least partly in the foundations of the building and/or in the piles of the building.

Preferably, the fluid comprises between 5 and 70 wt. % phase change material capsules, preferably between 5 and 40 wt. %.

The invention also relates to a method for cooling and/or heating a building, wherein at least the following steps are carried out by means of the system described above:
  circulating phase change material capsules in at least the device installed in said building or in the device installed in the subsurface in order to recover the heat of the building or of the subsurface respectively,
  capturing the heat of the building or of the subsurface by means of the phase change materials,
  continuing the circulation of the phase change material capsules and releasing the heat recovered by the phase change materials by means of at least said device installed in the subsurface for cooling the building or of the device installed in the building for heating the building respectively.

Preferably, the heat of the building or of the subsurface is captured by stopping the circulation of the phase change material capsules; once the phase change materials have captured sufficient energy, the phase change material capsules are circulated again, then circulation is stopped so that the phase change materials release the recovered heat in the subsurface to cool the building or in the building to heat it respectively.

BRIEF DESCRIPTION OF THE FIGURES

Other features and advantages of the system and/or of the method according to the invention will be clear from reading the description hereafter of embodiments given by way of non-limitative example, with reference to the accompanying figures wherein.

DETAILED DESCRIPTION OF THE INVENTION

The invention relates to a heat exchange system between a building and the Earth's subsurface, comprising a closed loop comprising at least one device (a pipe or a plate exchanger for example) installed in the subsurface for heat exchange with the subsurface, connecting pipes, and at least one device (a pipe for example) installed in the building for heat exchange with the building. The device installed in the subsurface is connected by the connecting pipes to the device installed in the building so as to form a closed loop. Thus, it is possible to circulate through this closed loop a fluid and the encapsulated PCMs circulating with the fluid to allow the heat of the building to be recovered and released in the subsurface and/or, conversely, to allow heat to be recovered from the subsurface and released in the building. In the case of heating, PCMs different from those used for cooling can for example be used, so that the melting temperature of each operation is optimal. To change the PCMs, the PCMs of the first operating mode (cooling for example) can for example be filtered, and other PCMs are injected for the second operating mode. In the first case, the building is thus cooled; in the second case, it is heated. The system according to the invention can be suited for only one of these two cases (permanent data centre cooling for example), or it can be suited for both cases successively (cooling in summer and heating in winter for a housing building for example). In addition, the closed loop comprises a circulation pump for circulating a fluid through the closed loop. Indeed, considering gravity and the head loss due to viscous friction, the fluid could not flow alone without a circulation pump. Besides, the system comprises the fluid, and the fluid comprises capsules containing phase change materials; in other words, the fluid is laden with encapsulated PCMs. The fluid therefore allows circulation of the phase change material capsules. This circulation of the phase change material capsules allows to simplify the system and to improve the energy efficiency of the system. Using capsules makes it possible to avoid clogging risks related to agglomerates that might occur if the phase change materials were not encapsulated.

For example, the system can be configured to allow intermittent circulation of the fluid, preferably a day/night cycle for example.

More specifically, the invention is suited for cooling buildings in summer.

PCMs are materials that have the ability to change their physical state (solid/liquid or liquid/vapor) within a limited temperature range. Unlike other materials or fluids that store energy only in form of sensible heat, PCMs possess the ability to store energy as two types of heat, sensible and latent. It is during the change in physical state thereof that they store or release energy as latent heat. PCMs thus store much more energy than other materials. During this process, PCMs remain at a stable temperature, which also allows the building to be kept at a stable temperature.

A PCM thus involves two advantages compared with a material delivering only sensible heat (no phase change):

its high energy storage capacity over the temperature range covering its phase change temperature. The result is a volume gain compared with a material delivering only sensible heat over the same temperature range. Indeed, for water for example, the volumetric heat capacity is 4.18 J/° C./cm³. The energy absorbed through heating from 15° C. to 25° C., i.e. a 10° C. temperature increase, thus is 42 J/cm³. If one considers now a PCM such as heptadecane, whose melting temperature is 22° C., the latent heat of melting L is 215 J per gram (167 J/cm³), and the volumetric heat capacity is 1.25 J/° C./cm³. The energy absorbed through heating from 15° C. to 25° C., i.e. a 10° C. temperature increase, is then 167+10*1.25=180 J/cm³, i.e. approximately 4.3 times that of water, which testifies to the relevance of PCMs for heat storage or release (the system being reversible), a near constant temperature maintenance during phase change, which provides higher energy flow stability between the PCM and each source, mainly the source consisting of the building whose temperature is to be controlled.

The system according to the invention allows heat to be captured from a heat source (a building for example) and restored to at least one cold source (for example, ground or groundwater, and possibly a second cold source such as the water network) distant from the atmospheric environment of the heat source. It thus fulfils three functions: an energy storage function, a transport function and an exchange function for this energy. These three functions are provided by a single carrier, namely a liquid-phase suspension of solid capsules containing the PCM, this assembly being referred to as "encapsulated phase change material (PCM) slurry".

According to a variant of the invention, the closed loop can comprise one or more additional pumps intended to facilitate or accelerate the fluid flow within the closed-loop circuit.

According to a configuration of the invention, the system can comprise a heat exchange means for heating a second fluid (water for example) getting to the building, preferably water from the public distribution network. The heat capacity of phase change materials can thus be used for heating the second fluid (notably water) of the building, which allows to recover part of the heat collected in the building, before releasing the rest of the energy recovered by the PCMs, notably through the latent heat of melting and therefore through a PCM phase change, into the subsurface.

This recovered heat can thus be used for preheating domestic hot water that needs to be brought to and maintained at a temperature above 50° C. to prevent *legionella* growth risks. The cold water of the distribution network (temperature of 15° C. to 21° C.) is sufficient for the PCM to start a liquid/solid phase change by releasing energy. Using this recovered heat for preheating the network water is therefore particularly advantageous for limiting the consumption of energy required to eventually reach a temperature above 50° C.

Preferably, the circulation pump can be a progressing cavity pump or an unbalanced vane pump. A progressing cavity pump comprises a helical rotor turning inside a helical stator. When the rotor turns inside the stator, cavities progress along the axis of the pump, without changing either the shape or the volume of the cavities. Thus, the progressing cavity pump is a constant-flow rotary positive displacement pump. It is particularly advantageous because its operation limits heating of the fluid. This pump can therefore be positioned anywhere on the closed-loop circuit.

Preferably, the circulation pump is configured to not heat the fluid and to not destroy the phase change material capsules.

Advantageously, the pump can be positioned on the part of connecting pipes that is configured to circulate (preferably that circulates) the phase change material capsules from a heat source to a cold source, the heat and cold sources respectively consisting of the building and the subsurface in summer (and vice versa in winter). Therefore, if the pump generates heating of the fluid, for example in the case of a centrifugal pump, the phase change materials can be cooled in the cold source, thus allowing better heat recovery from the heat source, notably to cool the building.

According to an implementation of the invention, the fluid can comprise water and preferably at least one additive selected from among a biocide, an antifreeze, a surfactant, a capsule dispersing agent and/or an anticorrosion additive. Using water allows to easily run and circulate the capsules through the pipes, and to reduce the cost of the system. In addition, in case of subsurface leakage, the environmental impact is reduced.

According to a variant of the invention, the phase change materials can comprise metals, metal alloys, inorganic materials, organic materials or hydrates, or mixtures of these materials. Preferably, the PCM metals and/or metal alloys can comprise gallium, whose melting temperature is between 26° C. and 28° C., suited to the cooling situation of the building; the inorganic materials can comprise calcium salts ($CaCl_2$), ·$6H_2O$, or $CaCl_2$), ·$2H_2O$); the organic PCM materials can comprise paraffins, fatty acids, esters, carboxylic acid, or mixtures of these different materials. Among phase change materials, paraffins are preferred for their stability and their lower sensitivity to the supercooling phenomenon. More preferably yet, the phase change materials can comprise a eutectic mixture of the materials described above, so as to reach a melting temperature that cannot be reached with pure compounds and/or to lower the PCM cost. Indeed, a eutectic mixture can allow to reach a melting temperature identical to that of a very expensive pure paraffin, but by using a mixture of paraffins that would be less expensive to purchase.

According to an embodiment of the invention, the material of the capsules can comprise organic, inorganic and/or metallic materials, or mixtures of these materials. For example, the organic materials for the capsules can comprise graphene, porous carbon, polymers, polyamides, nylon, lignins, fatty acids, esters, crown ethers; the inorganic materials for the capsules can comprise silica, molten silica. Of course, the capsules can consist of one or more of the materials described above, and they can consist of mixtures of these materials.

Metals have the advantage of providing good thermal conductivity. Polymers offer a good compromise between conductivity and flexibility. They also allow friction and noise to be reduced. Silica makes it possible to easily obtain functionalized materials.

The capsules can also come in form of molecular cages.

Preferably, the capsules can be functionalized by means of ionic molecules or of hydrophobic long chains, so that the capsules remain at a distance from one another by electrostatic or steric repulsion in the case of ionic molecules, and by steric repulsion in the case of hydrophobic long chains.

It is thus possible to avoid generating capsule agglomerates likely to cream, to sediment or even to cause clogging of the pipes.

Advantageously, the size of the capsules can range between 5 nm and 2 mm, and the material of the capsules wall can be between 0.5 nm and 500 µm thick. The capsules are therefore small, which facilitates their circulation in the carrier fluid. The average size of the capsules can correspond to the Sauter mean diameter. The thickness provides the capsules with sufficient strength. The thickness of the capsules is optimized according to each material so that the capsule is impervious to the PCM, its mechanical properties allow to withstand the expansion/compression stresses of the PCM depending on temperature, and the stresses applied by the circulation (elbow, restriction, pump, etc.), and so that thermal exchanges are maximized.

Preferably, at least part of the connecting pipes can comprise a thermal insulation layer. Thus, heat exchange between the subsurface and the building is improved. This makes it notably possible to avoid heating a part of the building through which the connecting pipes run, for example the lower floor, the foundations or the piles.

According to a variant of the invention, at least one device installed in the building can be located in at least one floor and/or at least one ceiling and/or at least one wall. Heat can thus be recovered in different places of the building, which provides greater flexibility upon design of the system and/or the building, and can allow to increase the heating or cooling performances.

Advantageously, at least one device installed in the building and/or at least one device installed in the subsurface can comprise several parallel branches and/or circulation loops. Heat recovery or release can thus be accelerated and increased. A circulation loop is understood to be a tortuous pipe intended to increase the length of the pipe in the space considered without increasing the footprint, which allows thermal exchanges to be increased.

According to a preferred implementation of the invention, the system can comprise temperature measurement means for measuring the temperature of the building and/or of the devices installed in the subsurface and in the building, and/or of the pipes and/or of the subsurface, and the system can comprise an automatic control system for starting and stopping the circulation pump depending on the temperatures recorded by the temperature measurement means. Thus, the fluid of the closed loop can be circulated when the temperature of the building exceeds a first predetermined temperature (28° C. for example). A building temperature measurement greater than this predetermined temperature automatically results in the circulation pump being started by the control system that receives the data from the temperature measurement means, so that the capsules located in the subsurface get into the device installed in the building. A temperature measurement on the installed device, sent to the control system, can then detect the presence of the cold fluid. The control system can then stop the pump so as to stop fluid circulation. Alternatively, the fluid could be allowed to flow for a predetermined time for the PCMs to get to the device installed in the building.

The PCMs then recover the heat from the building. The temperature of the building therefore decreases and the temperature of the device installed in the building increases. One or the other of these temperatures or both temperatures are recorded and sent to the control system. When a new threshold is crossed, the control system starts the pump again so that the PCMs that have captured the heat of the building get into the subsurface to release the captured heat.

Of course, the above example is for cooling the building, it is however clear that a reverse mode would allow the building to be heated.

Thus, the control system is configured to receive information from the temperature measurement means (thermometers, temperature sensors or thermocouples for example), and it compares these temperature measurements with one or more predetermined temperatures so as to actuate or deactivate (stop) the pump. Using the control system avoids continuous use of the pump and therefore limits energy consumption. Furthermore, circulation of the PCMs occurs only when they have recovered or released enough energy.

For example, the PCM crystallized in solid form then rises in temperature with the heat of the building, so as to store the heat of the building in order to cool it.

It then becomes first charged with energy through sensible heat, and then, as its melting point is reached (which depends on the PCM selected, 26° C. for example), it becomes charged with energy through latent heat while becoming liquid. During this time, its temperature and the temperature of the environment remain stable, at around the PCM melting temperature. When the temperature of the environment rises above the set PCM melting temperature, the slurry is circulated again.

According to a configuration, the system can be controlled in order to take account of the PCM phase change kinetics, which may be different according to whether it goes from the first state to the second state, or from the second state to the first state. Preferably, the system can comprise a control means for controlling the flow rate or the velocity of the fluid in order to control the amount of heat recovered and/or to optimize the operation of the circulation pump.

In an implementation of the invention, the system (notably the closed-loop circuit) can comprise a drain point and/or a point where the encapsulated PCMs (or the fluid comprising the encapsulated PCMs) can be pumped and/or, on the contrary, injected into the closed loop, this pumping/injection point being preferably located above ground, so as to replace the encapsulated PCMs and/or the fluid if the charged fluid has lost capacities due to the deterioration of the capsules for example, for sampling or for adding additives for example.

Advantageously, at least one subsurface pipe can be positioned at a depth of between 4 m and 100 m below ground level, this depth enabling good heat release and a stable temperature generally ranging between 12° C. and 15° C., which provides good cooling of the PCMs and therefore of the building.

Alternatively, at least one subsurface device could be positioned at a depth greater than 100 m, which, as a result of the geothermal gradient (increase in temperature with depth in the Earth), would allow to obtain a temperature close to 20° C. providing more efficient heating of the building.

According to a variant of the invention, the connecting pipes can be installed at least partly in the foundations of the building and/or in the piles of the building. Therefore, it is not necessary to bore other holes. In addition, thermal insulation can be provided.

Preferably, the fluid can comprise between 5 wt. % and 70 wt. % (preferably between 5% and 40%) of phase change material capsules. Thus, the PCM density is sufficient to recover/release the heat, and it also allows good circulation of the PCMs with the fluid. Therefore, the energy consumption of the pump for circulating the fluid is optimal. Higher concentrations are not prohibited, however a high relative viscosity increase causes a high pressure drop and heating of the fluid.

The invention also relates to a method for cooling and/or heating a building, wherein at least the following steps are carried out by means of the system according to one of the features described above:
- circulating phase change material capsules in at least the device installed in the building or in the device installed in the subsurface in order to recover the heat of the building or of the subsurface respectively, so as to cool the building by means of the subsurface and/or to heat the building by means of the subsurface,
- capturing the heat of the building or of the subsurface by means of the phase change materials,
- continuing the circulation of the phase change material capsules and releasing the heat recovered by the phase change materials, respectively by means of at least the device installed in the subsurface for cooling the building or of the device installed in the building for heating the building.

Due to the circulation of phase change materials, the method is simple and it enables better heat recovery/release.

The various steps can be carried out with a continuous fluid flow or with an intermittent flow (with flow phases and flow stop phases so as to allow time for the PCMs to charge/discharge heat).

Preferably, the heat of the building or of the subsurface can be captured by stopping the circulation of the phase change material capsules; once the phase change materials have captured sufficient energy (for example, when the temperature of the building rises above a predetermined temperature, or when the temperature of the device installed in the building exceeds a threshold value), the phase change material capsules are circulated again, then circulation is stopped so that the phase change materials release the recovered heat respectively in the subsurface to cool the building or in the building to heat it.

Judiciously starting and stopping the pump by means of a control system and of the temperature measurement means makes it possible to limit the energy consumption and to optimize the PCM heat recovery.

According to an embodiment of the method of the invention, at least the following steps can be carried out to heat a building:
- circulating phase change material capsules in at least the device installed in the subsurface,
- capturing the heat of the subsurface by means of the phase change materials,
- continuing the circulation of the phase change material capsules and releasing the heat recovered by the phase change materials in the subsurface into the building by means of at least the device installed in the building.

Preferably, the following steps can be carried out to heat a building:
- capturing the subsurface heat by stopping the circulation of the phase change material capsules (by stopping the circulation pump automatically via the control system),
- once the phase change materials have captured sufficient energy (when a temperature measured by a temperature measurement means exceeds a threshold value in the subsurface or drops below a predetermined temperature in the building for example), circulating the phase change material capsules again (by restarting the circulation pump automatically via the control system),
- stopping the circulation (by stopping again the circulation pump automatically via the control system) so that the phase change materials release the heat recovered in the subsurface into the building.

When the same system is used to heat a building (in winter for example), then, at another time, to cool it (in summer for example), it may be necessary to change the PCMs. Indeed, the melting point of PCMs suited to the operating mode for cooling the building can be different from the melting point of PCMs suited to the operating mode for heating the building. This is notably the case when thermal exchanges are to be optimized. In this case, to change the operating mode of the system, it may be arranged to filter and store the PCMs of one operating mode (heating for example) and to feed into the fluid of the closed loop other PCMs for the second operating mode (cooling for example). Therefore, the system can comprise a PCM filtering means (a filter enabling the fluid to flow through and retaining the encapsulated PCMs), a tank for storing the first PCMs (suited for the heating operating mode for example), a tank for storing the second PCMs (suited for the cooling operating mode for example), and a delivery means for feeding the first or second PCMs into the closed loop.

Figure 1:
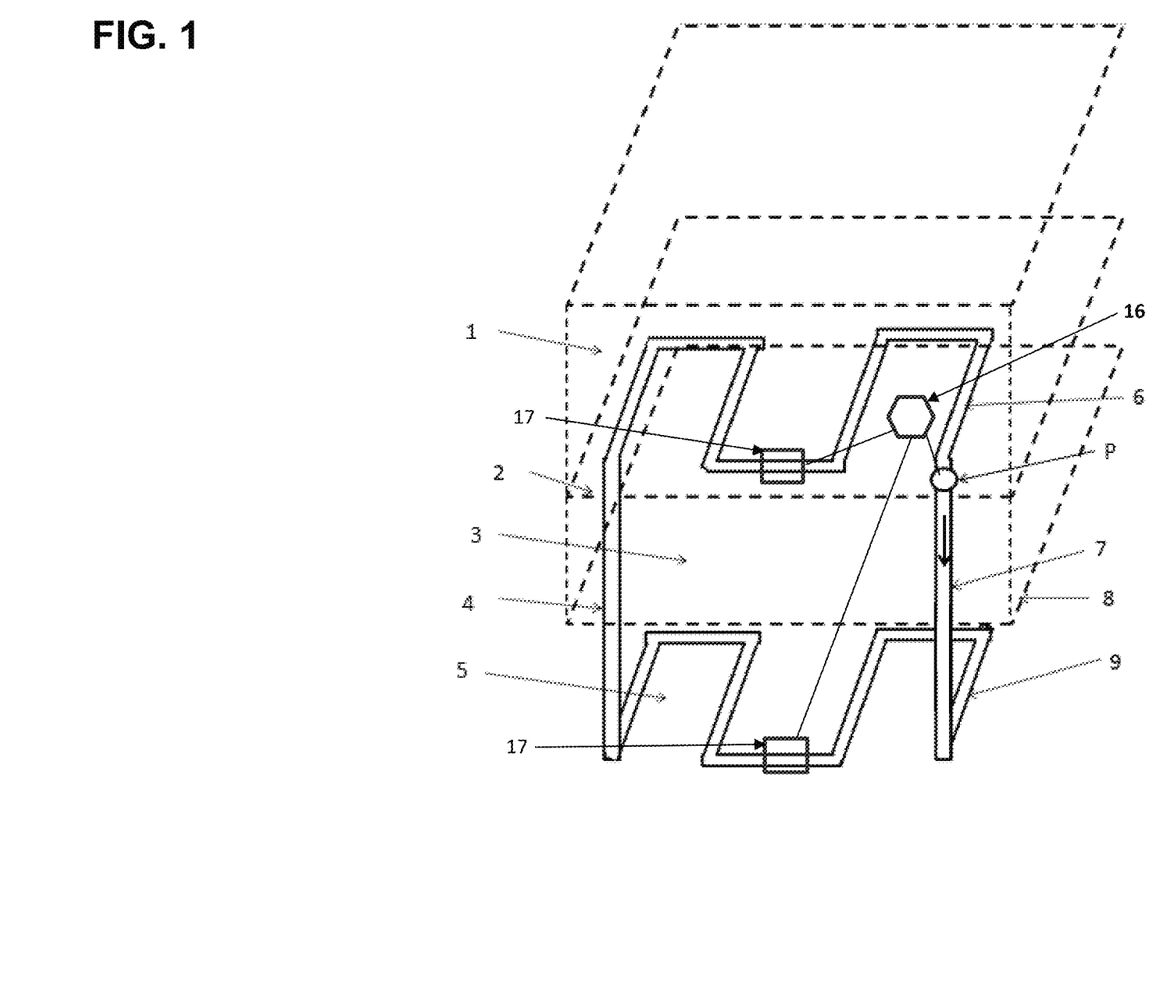
FIG. 1 shows a first embodiment of the system according to the invention.

FIG. 1 schematically illustrates, by way of non-limitative example, a first embodiment of the system according to the invention.

The system comprises a device installed in building 1, a pipe 6 here, connected by connecting pipes 4 and 7 to a device installed in subsurface 5, a pipe 9 here.

Plane 2 illustrated by dotted lines represents the lower plane of building 1.

Plane 8 illustrated by dotted lines represents the subsurface level where pipe 9 starts, i.e. the level from which the subsurface acts as a cold source or a heat source for cooling or heating the phase change materials.

Space 3 between lower plane 2 of building 1 and plane 8 where pipe 9 starts represents the space where connecting pipes 4 and 7 are installed. Space 3 comprises the Earth's surface, the foundations of building 1 and/or the piles of building 1.

Pipes 6, 7, 9 and 4 make up a closed loop in which circulates (or can circulate, when circulation is not continuous) a fluid laden with phase change material capsules. Indeed, the fluid circulation can be continuous or discontinuous in the closed loop, depending on the operating modes considered and on the overall size of the system.

The arrow in pipe 7 illustrates the direction of flow of the capsules-laden fluid in the closed loop.

A pump P providing circulation of the capsules-laden fluid in the loop is shown on the closed-loop circuit. Pump P is controlled by a control system 16 that receives information from temperature measurement means 17, such as temperature sensors, probes, thermocouples or thermometers, which may be positioned in building 1, in subsurface 5 close to pipe 9 installed in subsurface 5, in or on the pipes, and more particularly in or on pipes 6 installed in building 1 and/or pipes 9 installed in subsurface 5.

Depending on the temperatures measured and on the comparisons of these temperatures with predetermined minimum and/or maximum temperatures, the control system can then activate pump P to allow circulation of the capsules-laden fluid, which allows capture of the heat in building 1 or in subsurface 5, in order to subsequently discharge it into the other. Monitoring the temperatures allows to stop the circulation when necessary, so as to improve the cooling or heating performances of building 1 and to minimize the energy consumption (electrical energy for example) required to operate pump P. According to a variant, pump P can be operated, once activated, for a predetermined period of time (for example for preliminary system tests in the actual layout situation, which notably depends on the length of pipes 6, 4, 7 and 9, on the depth of burial of pipe 9 in subsurface 5, on the inside diameter of pipes 6, 4, 7 and 9, on the fluid viscosity, the proportion of capsules in the fluid and the size thereof, etc.).

When pump P generates heating of the fluid (a centrifugal pump for example), the pump is advantageously positioned between the heat source (represented here by pipe 6 installed in building 1 for heating the building) and the cold source (represented here by pipe 9 installed in subsurface 5 to allow cooling of the building), in the direction of flow of the fluid shown by the arrow.

Thus, if the building is to be heated while keeping pump P in the same place, the fluid can be circulated in the opposite direction to the direction shown in FIG. 1.

Besides, when the pump does not generate heating of the fluid, the direction of flow of the fluid in pipe 7 could similarly be in the opposite direction for cooling and for heating the building.

Figure 2:
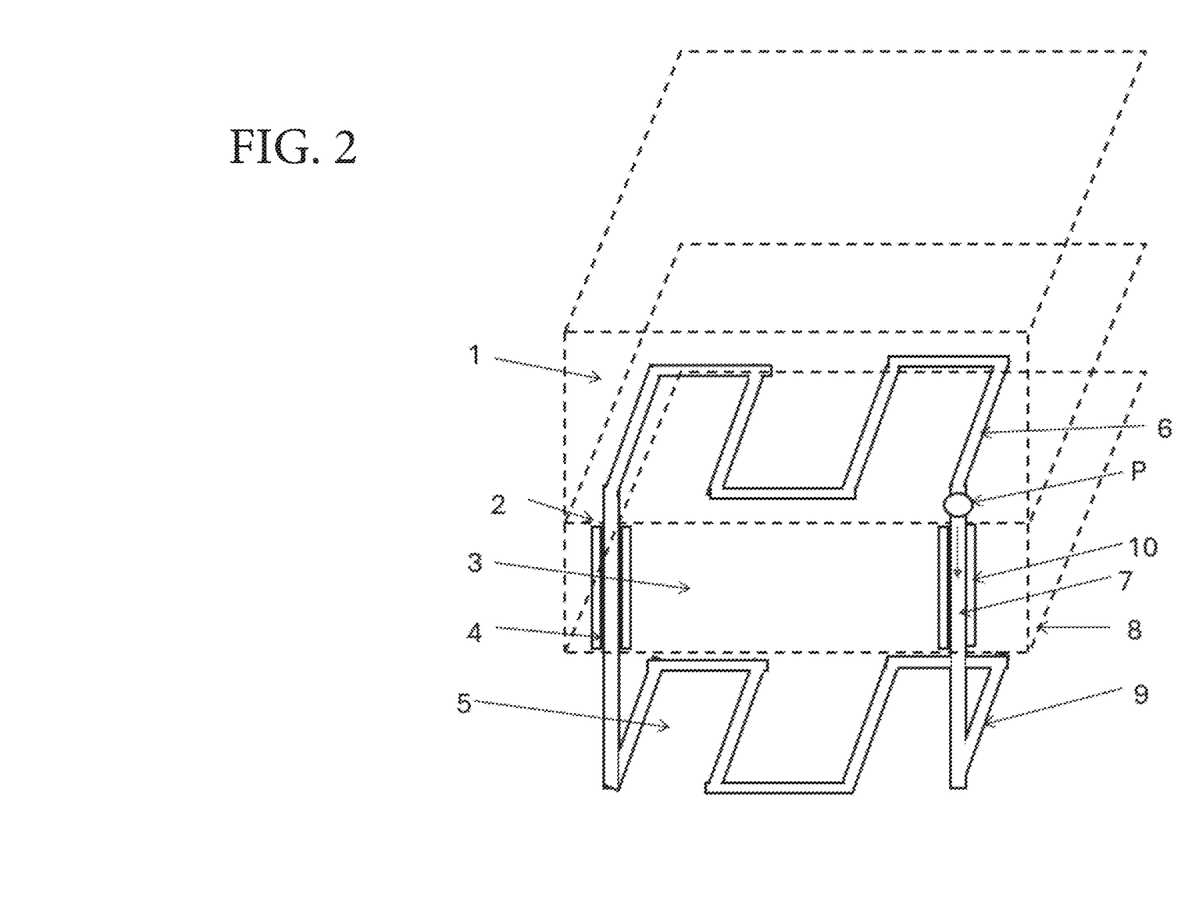
FIG. 2 shows a second embodiment of the system according to the invention.

FIG. 2 schematically illustrates, by way of non-limitative example, a second embodiment of the system according to the invention.

This system is different from FIG. 1 in that thermal insulation layers 10 have been added on connecting pipes 4 and 7 so as to promote thermal exchanges between building 1 and subsurface 5. The thermal insulation layer can for example be a layer of polymer materials such as foams or aerogels, made of glass fibers or rock wool.

References identical to those of FIG. 1 correspond to the same elements and are therefore not described again.

Figure 3:
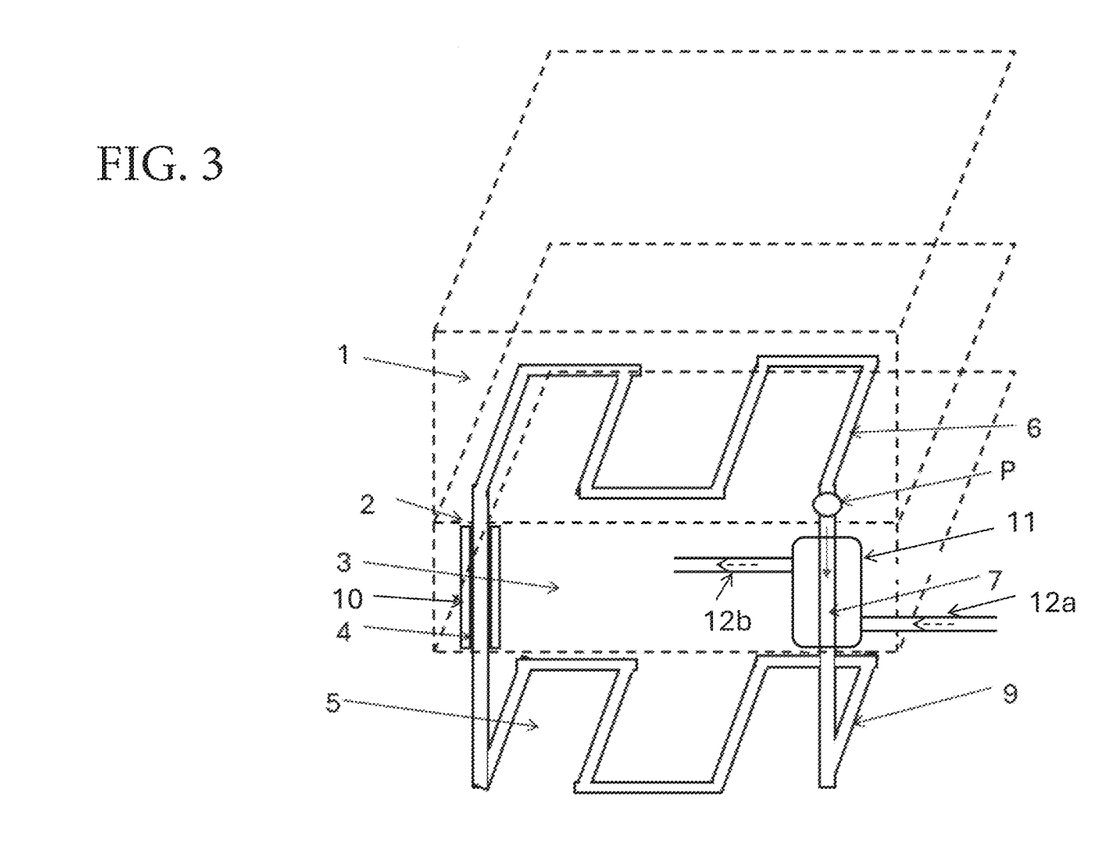
FIG. 3 shows a third embodiment of the system according to the invention.

FIG. 3 schematically illustrates, by way of non-limitative example, a third embodiment of the system according to the invention.

This system is different from FIG. 2 in that a heat exchange means has been added, here a heat exchanger 11 without direct contact, on one of the connecting pipes, connecting pipe 7 here. The other connecting pipe 4 remains provided with a thermal insulation layer, but it also might not be provided therewith, as in FIG. 1.

Heat exchanger 11 enables heat exchange between the fluid laden with phase change material capsules and another fluid (referred to as second fluid hereafter). Furthermore, in order to keep the fluid laden with phase change material capsules in the closed loop, heat exchanger 11 allows no direct exchange between these two fluids: in other words, a wall is required to prevent the two fluids from mixing. This can be achieved by means of a shell and tube exchanger or of a spiral tube heat exchanger.

The second fluid flows through a pipe 12a that opens into heat exchanger 11. The second fluid can then heat up while the capsules-laden fluid cools down due to its heat capacity.

The second fluid leaves heat exchanger 11 through a line 12b, warmer than it was when it flew in.

Advantageously, pipe 12a comes from a water distribution network, the second fluid being then water, for example from the public water network, and pipe 12b allows circulation of the water heated in building 1.

Thus, the heat captured in the building for example by the phase change materials is used to heat the water necessary for the building, the heat remaining in the PCMs (essentially through latent heat of melting) is then discharged to subsurface 5 through pipe 9 installed in subsurface 5. For example, it can be planned to preferentially heat the water feeding a hot water tank in the building, so as to avoid sending the heat partly back to the building. Thus, in pipe 9 installed in the subsurface, the PCMs complete their phase change.

Heating network water also allows to limit the environmental impact of the heat transmitted to the ground while saving energy.

Alternatively, heat exchanger 11 could be used to cool the second fluid.

References identical to those of FIGS. 1 and 2 correspond to the same elements and are therefore not described again.

Figure 4:
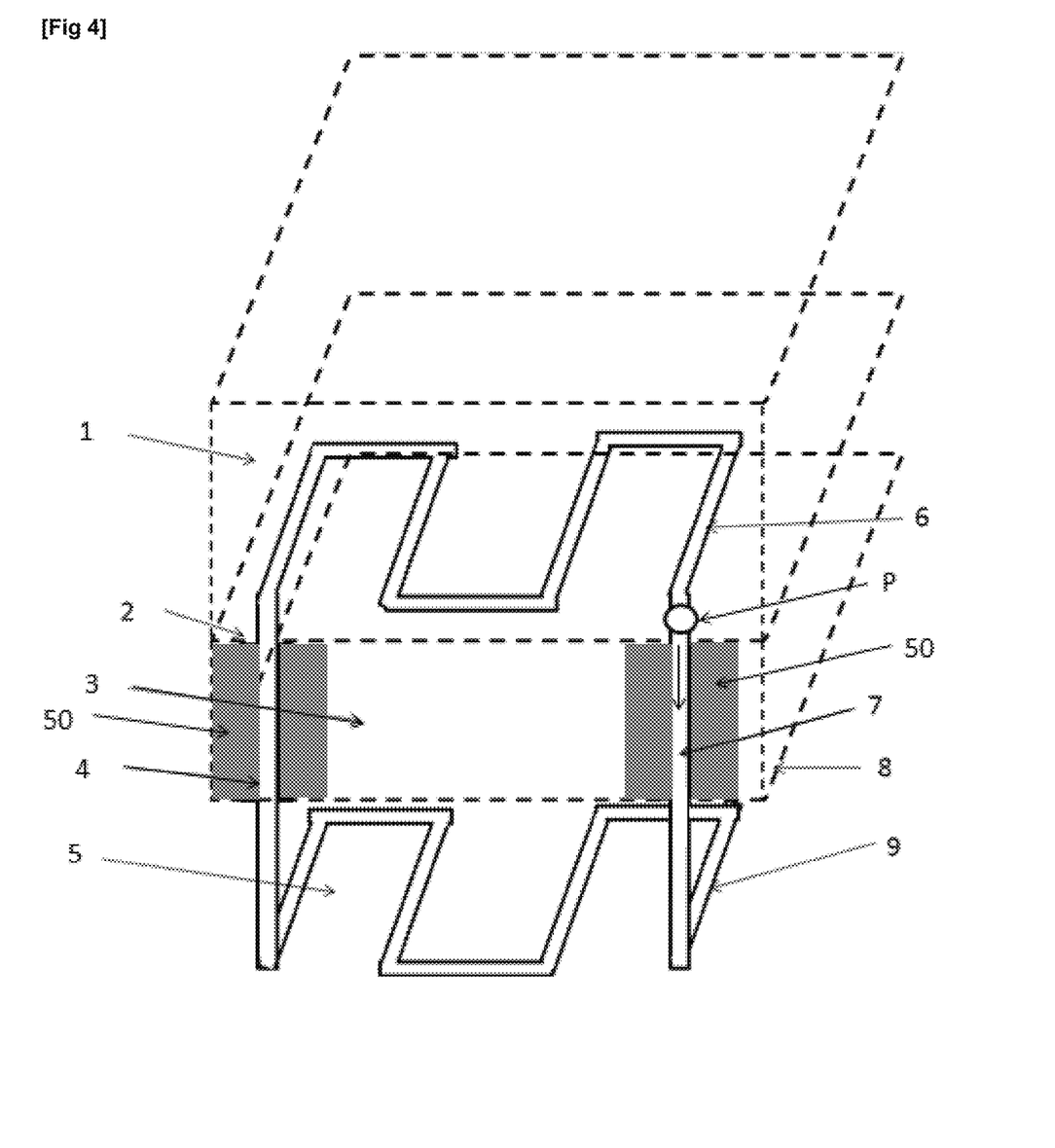
FIG. 4 shows a fourth embodiment of the system according to the invention.

FIG. 4 schematically illustrates, by way of non-limitative example, a fourth embodiment of the system according to the invention.

This system is different from FIG. 1 in that pipes 4 and 7 are installed in foundation piles 50 of building 1, which allows to limit drilling in the ground, thereby reducing costs on the one hand and the environmental impact on the other hand.

References identical to those of FIG. 1 correspond to the same elements and are therefore not described again.

Figure 5:
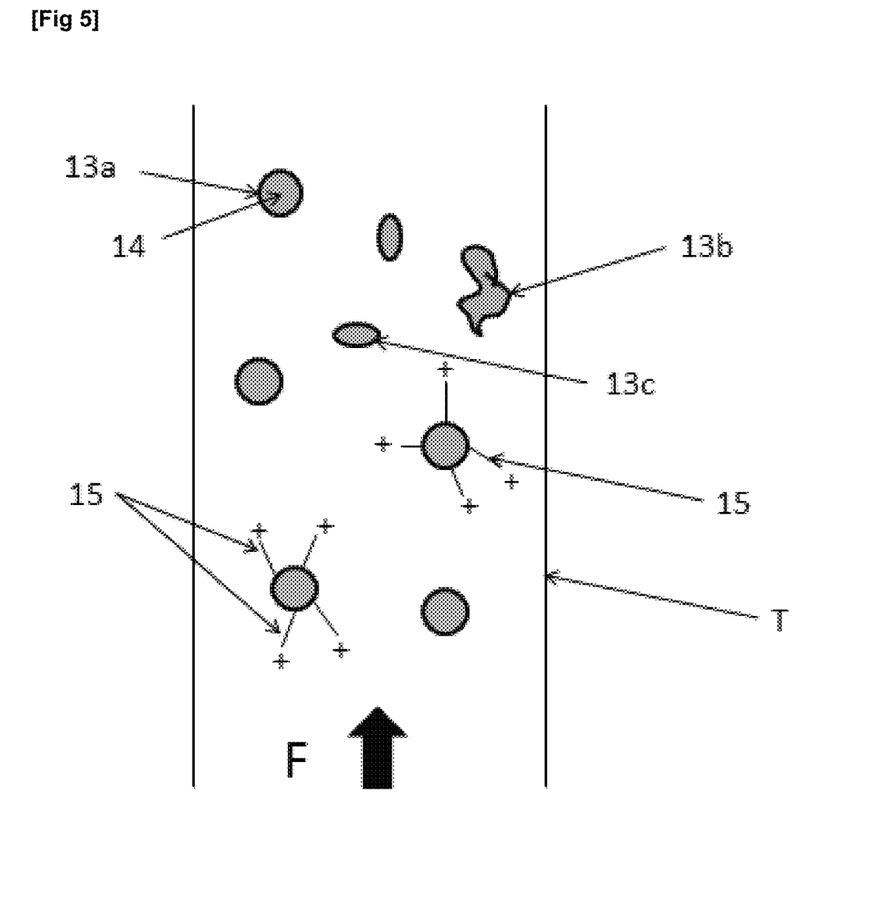
FIG. 5 shows the fluid laden with phase change material capsules in a pipe of the system according to the invention.

FIG. 5 schematically illustrates, by way of non-limitative example, the circulation F of the fluid laden with capsules 13a, 13b, 13c of phase change materials 14 in a pipe T that may be a device installed in the building, a connecting pipe or a device installed in the subsurface, such as pipes 4, 6, 7 or 9 of FIGS. 1 to 4.

Capsule 13a has a spherical or cylindrical shape for example (capsule 13a has a circular section), capsule 13c has an elliptical section and capsule 13b has any shape.

As visible in FIG. 5, capsules 13a, 13b or 13c represented by solid black outer shells (or skins) contain a gray phase change material 14.

The fluid flowing through pipe T entrains capsules 13a, 13b or 13c of phase change materials 14. Arrow F shows the direction of flow of the fluid in pipe T.

Furthermore, some capsules, or preferably all the capsules, can be functionalized by ionic molecules 15, positive charges+ are shown here, but negative charges could be used alternatively. Thus, by charging the capsules with the same charge (positive here), they tend to naturally repel each other through electrostatic repulsion, which prevents capsule agglomerates, and therefore risks of creaming, sedimentation or even clogging of pipe T.

Alternatively or in combination with the ionic functions, hydrophobic functions, notably hydrophobic long chains, can be grafted in order to use the steric repulsion mechanism (entropy reduction). Covalent functionalization is privileged, but weak bond functionalization may also be considered.

Figure 6:
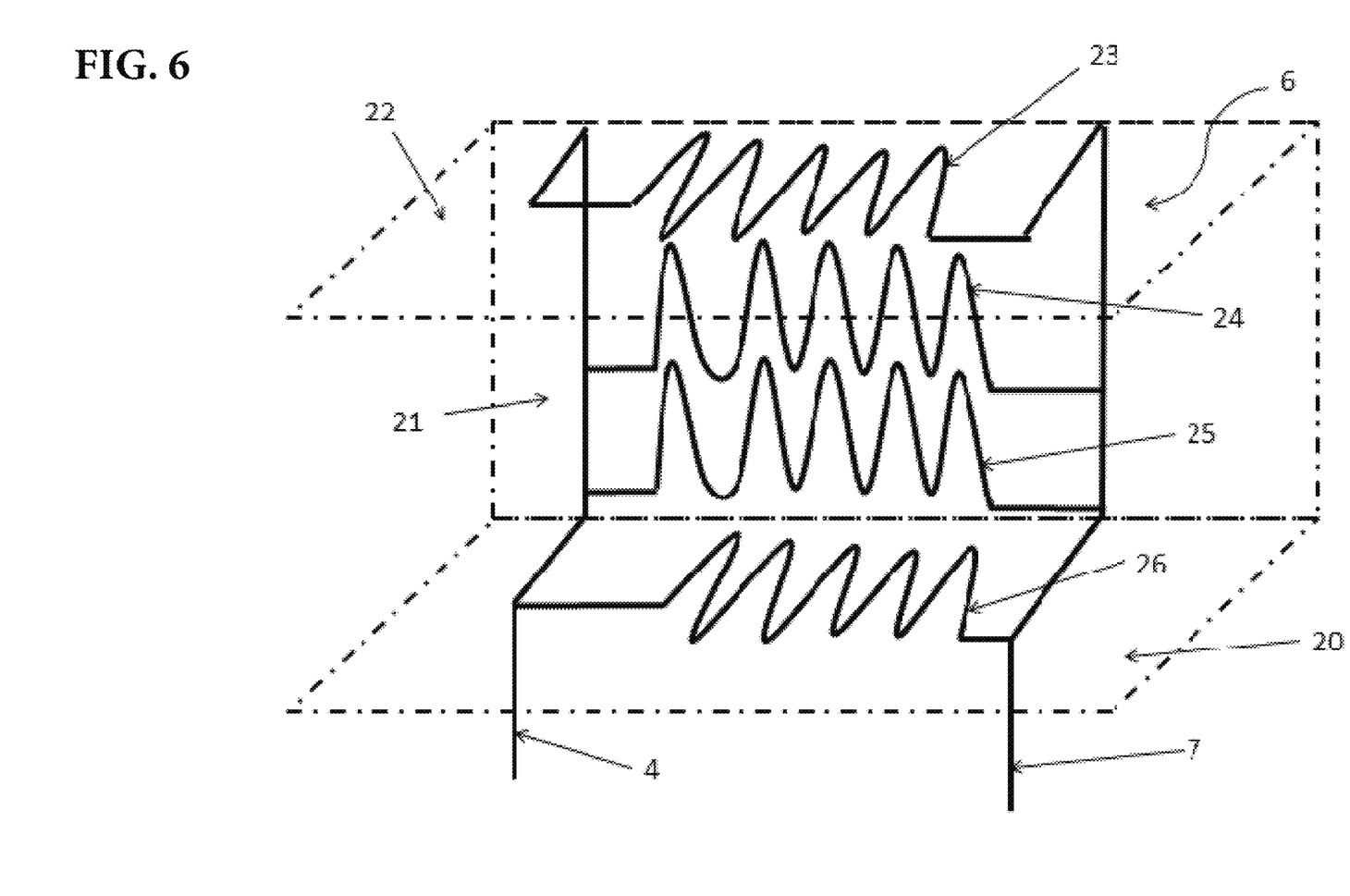
FIG. 6 shows a variant of the pipes installed in the building of the system according to the invention.

FIG. 6 schematically illustrates, by way of non-limitative example, a device installed in the building, here a pipe installed in the building, comprising several branches in parallel.

Indeed, pipe 6 installed in the building comprises a first branch 26 installed in floor 20 of the building, a second and a third branch 24 and 25 installed in a vertical wall 21 of the building, and a fourth branch 23 installed in ceiling 22 of the building. As illustrated in FIG. 6, these branches 23, 24, 25 and 26 are mounted in parallel, and they are connected to connecting pipes 4 and 7.

The various branches 23, 24, 25 and 26 comprise tube portions forming loops (or undulations) so as to optimize thermal exchanges with the building, the ceiling, the vertical wall or the floor. In other words, branches 23, 24, 25 and 26 comprise tortuous circulation loops.

The flow rate in each branch 23, 24, 25, 26 can be determined by the length, the section and the tortuosity of each branch so as to best meet the needs of the building. For example, in FIG. 6, since the heat tends to rise to the ceiling, circulating a higher flow rate through branch 23 than through the other branches may be interesting.

Figure 7:
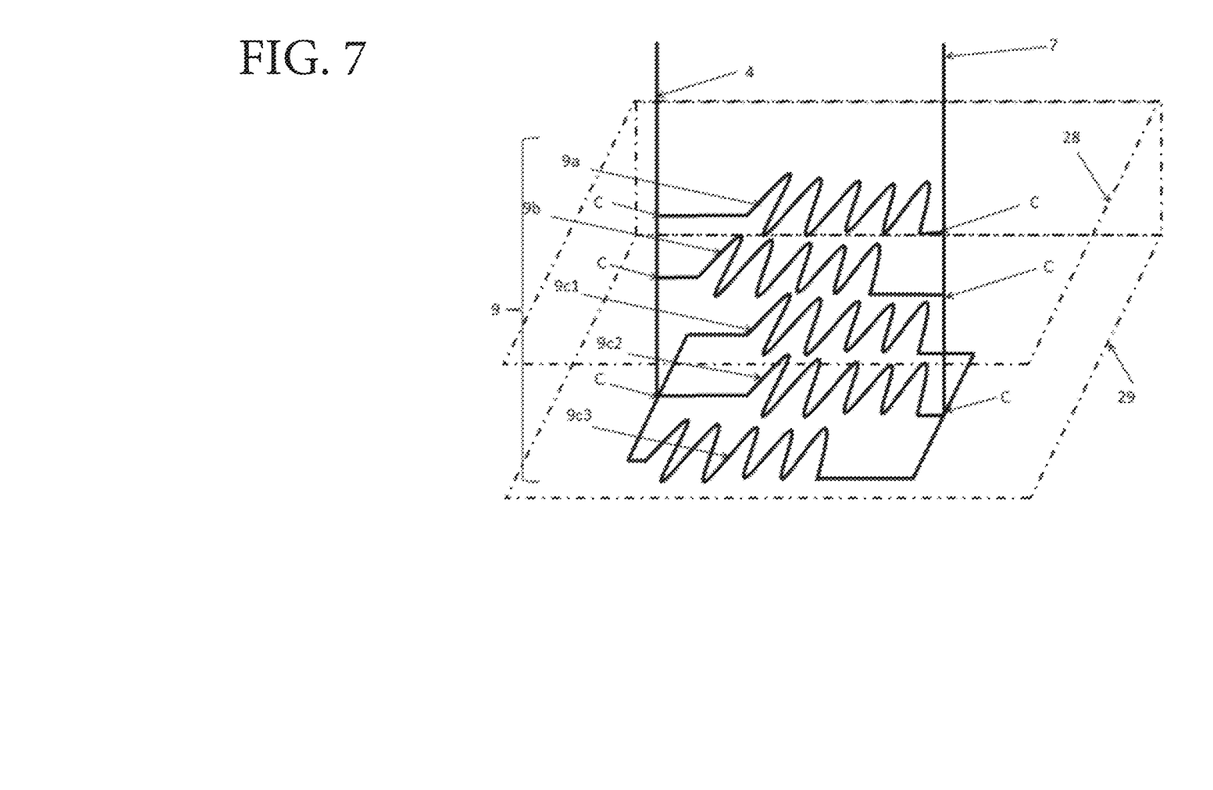
FIG. 7 shows a variant of the pipes installed in the subsurface of the system according to the invention.

FIG. 7 schematically illustrates, by way of non-limitative example, a pipe installed in the subsurface and comprising several branches in parallel.

Indeed, pipe 9 installed in the subsurface comprises a first branch 9a installed at a first depth below the surface, a second branch 9b at a second depth below the surface, the second depth being greater than the first depth, and three branches 9c1, 9c2 and 9c3 located at a third depth below the surface, the third depth being greater than the first and second depths.

The subsurface where pipe 9 is installed is delimited by an upper horizontal plane 28 and a lower horizontal plane 29.

The various branches 9a, 9b, 9c1, 9c2, 9c3 are mounted in parallel and connected to each other by connections C. Thus, in this embodiment, there may be parallel branches mounted vertically above one another and/or installed next to each other in the same horizontal plane. Alternatively, in order to further improve heat diffusion in the ground, two successive branches could be installed at a different vertical level without being one above the other and in a different horizontal plane (i.e. horizontally offsetting the branches located at different vertical levels), for example the branches could be organized in staggered vertical arrangements. As illustrated in FIG. 7, these branches 9a, 9b, 9c1, 9c2 and 9c3 are mounted in parallel and connected to connecting pipes 4 and 7.

The various branches 9a, 9b, 9c1, 9c2 and 9c3 comprise tube portions forming loops (or undulations) so as to optimize thermal exchanges. In other words, branches 9a, 9b, 9c1, 9c2 and 9c3 comprise tortuous circulation loops.

Of course, the invention is not limited to the above embodiments. Combinations of the embodiments of FIGS. 1 to 4 and 6 and 7 are possible without departing from the scope of the invention.

The system according to the invention allows to improve the thermal performances and, therefore, to reduce the length of pipes, which allows to reduce the environmental impact, the footprint of the system and the cost of the system.

The invention claimed is:

1. A heat exchange system between a building and the Earth's subsurface, comprising a closed loop comprising at least one device installed in said subsurface for heat exchange with subsurface, connecting pipes, and at least one device installed in said building for heat exchange with building, the at least one device installed in the subsurface being connected by the connecting pipes to the at least one device installed in the building, the closed loop comprising at least one circulation pump for circulating a fluid through said closed loop, the at least one circulation pump comprising a progressing cavity pump, characterized in that the fluid comprises capsules containing phase change materials).

2. The system as claimed in claim 1, wherein the system comprises a heat exchanger for heating a second fluid flowing into the building, the second fluid preferably being water from a water distribution network.

3. The system as claimed in claim 1, wherein the at least one circulation pump is positioned on a part of connecting pipes configured for circulating capsules of phase change materials from a heat source to a cold source, the cold and heat sources being building and subsurface respectively, or vice versa.

4. The system as claimed in claim 1, wherein the material of capsules comprises silica, molten silica, graphene, biological porous carbon, polymers, polyamides, nylon, lignins, fatty acids, esters, crown ethers, and/or the capsule is a molecular cage.

5. The system as claimed in claim 1, wherein capsules are functionalized with ionic molecules or hydrophobic long chains.

6. The as claimed in claim 1, wherein the fluid comprises water.

7. The system as claimed in claim 1, wherein phase change materials comprise metals, metal alloys, inorganic materials, organic materials or hydrates, preferably, the phase change materials comprise gallium, calcium salts, fatty acids, esters, carboxylic acid, or a eutectic mixture of these materials.

8. The system as claimed in claim 1, wherein the size of capsules ranges between 5 nm and 2 mm, and the thickness of the material of capsules ranges between 0.5 nm and 500 µm.

9. The system as claimed in claim 1, wherein at least part of connecting pipes comprises a thermal insulation layer.

10. The system as claimed in claim 1, wherein at least one device installed in the building is located in at least one floor, in at least one ceiling and/or in at least one wall.

11. The system as claimed in claim 1, wherein at least one device installed in the building and/or at least one device installed in the subsurface comprises several parallel branches and/or circulation loops.

12. The system as claimed in claim 1, wherein the system comprises temperature measurement means for measuring a temperature of building and/or of the pipes and/or of the at least one device installed in the subsurface or the at least one device installed in the building, and/or of the subsurface, and the system comprises an automatic control system for starting and stopping the circulation pump depending on the temperatures recorded by the temperature measurement means.

13. The system as claimed in claim 1, wherein the at least one device installed in the subsurface is positioned at a depth of between 4 m and 100 m below the ground surface.

14. The system as claimed in claim 1, wherein the connecting pipes are installed at least partly in foundations of the building and/or in piles of the building.

15. The system as claimed in claim 1, wherein the fluid comprises between 5 and 70 wt. % of capsules of phase change materials.

16. The system as claimed in claim 1, wherein phase change materials comprise paraffins.

17. The system as claimed in claim 1, wherein the fluid comprises water and an additive selected from among a biocide, an antifreeze, a surfactant, a capsule dispersing agent and/or an anticorrosion additive.

18. The system as claimed in claim 1, wherein the fluid comprises between 5 and 40 wt. % of capsules of phase change materials.

19. A method for cooling and/or heating a building, wherein at least the following steps are carried out by means of the system as claimed in claim 1:
   circulating capsules of phase change materials in at least device installed in said building or in device installed in the subsurface in order to recover the heat of building or of subsurface respectively,
   capturing the heat of building or of subsurface by means of phase change materials,
   continuing the circulation of capsules of phase change materials, and releasing the heat recovered by phase change materials by means of at least said device installed in the subsurface for cooling building or of device installed in the building for heating building.

20. The method for cooling and/or heating a building as claimed in claim 19, wherein the heat of building or of subsurface is captured by stopping the circulation of the capsules of phase change materials; once phase change materials have captured sufficient energy, the capsules of phase change materials are circulated again, then circulation is stopped so that phase change materials release the recovered heat respectively in subsurface to cool the building or in the building to heat the building.

\* \* \* \* \*